United States Patent

[11] 3,634,695

[72] Inventor: Anthony Rene Barringer, Willowdale, Ontario, Canada
[21] Appl. No.: 7,964
[22] Filed: Feb. 2, 1970
[45] Patented: Jan. 11, 1972
[73] Assignee: Barringer Research Limited, Rexdale, Ontario, Canada
[32] Priority: Feb. 4, 1969
[33] Canada
[31] 06025/69

[54] AUTOMATIC TRANSFORM ANALYZER
9 Claims, 1 Drawing Fig.

[52] U.S. Cl. ........................... 250/219 F, 250/219 DQ, 250/237, 340/15.5, 356/162, 356/233
[51] Int. Cl. .............................................. G01n 21/30
[50] Field of Search ........................... 350/162; 340/15.5; 250/219 R, 219 F, 219 QA, 229; 356/233

[56] References Cited
UNITED STATES PATENTS

| 3,370,268 | 2/1968 | Dobrin | 350/162 |
| 3,409,872 | 11/1968 | Hogg | 350/162 |
| 3,497,704 | 2/1970 | Holmes | 350/162 |

Primary Examiner—Archie R. Borchelt
Assistant Examiner—D. C. Nelms
Attorney—Rogers, Bereskin & Parr

ABSTRACT: An optical data processing system of the coherent spatial filter type which (a) produces enhancement of the contrast of filtered images before they are photographed by providing a controllable optical attenuator in the path of the filtered light, the amount of light permitted to shine through the attenuator being a function of the intensity of the light, and (b) produces a rose diagram by providing a rotatable slit of adjustable length that is rotated in synchronism with the spatial filter, the length of the split being varied in accordance with the intensity of the light passing through the spatial filter; a camera is provided to record light from a conventional source that is collimated and passed through the rotatable slit.

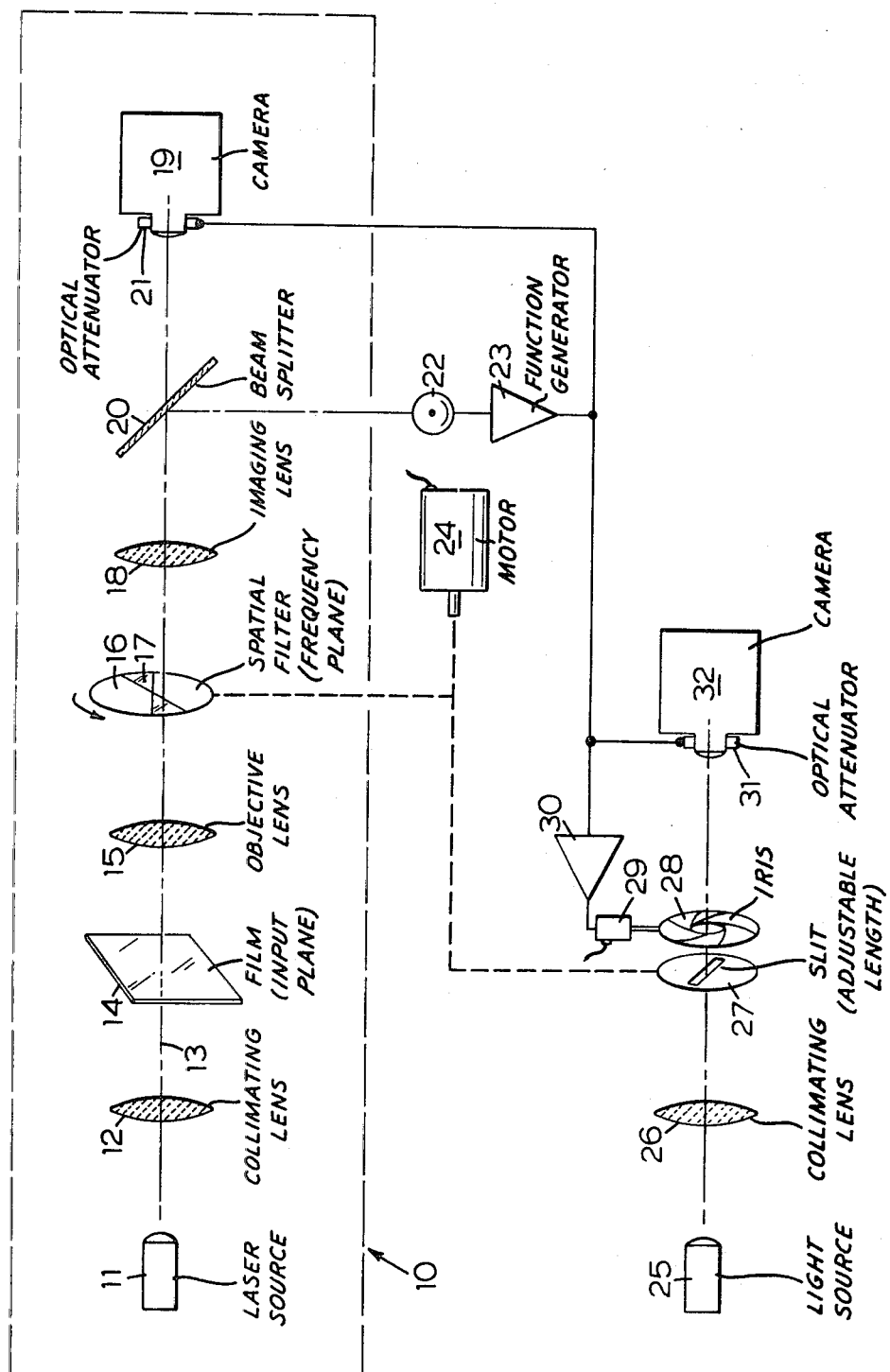

AUTOMATIC TRANSFORM ANALYZER

This invention relates to the art of optical data processing and in particular to a method and an apparatus for automatically analyzing nonrandom information presented in the form of a two-dimensional spatial plot. The apparatus can be used, for example, to analyze and enhance nonrandom features in aerial photographs (such as lineaments caused by faults, glacial movement, major geological structures, etc.), transparencies of seismograms and contour maps. More generally, the invention is intended for use in the rapid analysis of relationships among spatial features or data whose characteristics can be transformed to the equivalent of spatial features in a two-dimensional transparency.

Optical data processing systems are becoming increasingly more important in the design of electronic data filtering systems, particularly those used in the earth sciences field. A review of various conventional optical processing techniques is given in an article by A. Vander Lugt, Optica Acta, 1968, vol. 15, No. 1, page 1. Such techniques are particularly useful in the analysis of data wherein the information to be processed has two degrees of freedom, such as a photograph, which contains both position and density information. An important type of such optical processing system is one which utilizes coherent illumination to provide optical spatial filtering. Briefly, the theory of spatial filtering is as follows.

Light from a coherent source such as a laser is collimated to render it parallel, and is directed towards a first spherical lens. A transparency containing data to be filtered or analyzed is positioned between the collimating lens and the first lens, at a distance equal to the focal length of the first lens. The plane containing the transparency is called the input plane. An optical filter such as a pair of knife-edged wedges, annular rings or opaque discs, etc. is positioned on the opposite side of the first lens, at a distance equal to one focal length of the first lens. The plane containing the optical filter is called the transform plane, because the information resolved in this plane has all the properties of the Fourier transform of the information contained in the transparency. A second spherical lens is positioned on the opposite side of the optical filter, at a distance equal to the focal length of the second lens. The second lens converts the information contained in the transform plane into a second Fourier transform. However, as the transform of a transform of a function is the original function itself, the image produced by the second lens is similar in appearance to the image contained in the original transparency, although it may be reduced or enlarged. However, by blocking certain portions of the light in the transform plane the image formed by the second lens will be devoid of certain spatial frequencies, depending upon the kind and position of the optical filter that is used.

An important application of the present invention is the analysis of air photographs containing lineaments or other nonrandom structures which provide significant clues to the nature of the underlying earth structure. The manual analysis of such photographs is laborious and moreover it is often difficult to trace the directions of weakly developed features of interest in the presence of dominant elements. For example, prominent stream patterns and lines made by trees or other vegetation trending in one direction tend to conceal fault outcrops and other lineaments trending in other directions. Directional filtering of all lines interfering with the weak features of interest can sufficiently enhance them so that they become readily observable.

In conventional geological analysis it is usual to estimate the density and direction of the lineaments of each air photograph, as an aid to determining the existence of major fault zones, etc. This information is conveniently depicted in a so-called "rose diagram," which consists of a polar plot of the lineaments, wherein the angular variable corresponds to the angular positions of lineaments trending in one direction, and the radial distance variable corresponds to the density of the lineaments trending in the same direction.

Objects of the present invention are to provide apparatus capable of automatically producing a polar plot or rose diagram of data contained in a transparency, and at the same time or separately to enhance the contrast of any nonrandom features of interest in transparencies containing data to be analyzed.

A preferred embodiment of the invention is illustrated in the accompanying drawing, which is a block diagram of an optical processing system according to the invention, incorporating means for enhancing the contrast of nonrandom features of interest contained in transparencies, and means for automatically producing a polar plot or rose diagram of data contained in such transparencies.

Referring to the drawing, the elements of a conventional coherent optical data processing system are contained within a rectangle composed of dashed lines 10. Also included within the dashed lines 10 is a beam splitter 20 which is not usually employed in such apparatus, and whose function will be described below. A laser 11 or other source of coherent light illuminates a collimating lens 12 which renders the light parallel and directs it along an optical axis 13 to a photographic transparency 14 such as an air photograph. Light passing through the transparency 14 is directed towards an objective lens 15 which forms a Fourier transform of the information contained in the transparency 14 in a plane containing a spatial filter 16. The transparency 14 and the spatial filter 16 are spaced from the objective lens 15 by a distance equal to one focal length of the objective lens 15. The spatial filter 16 6 may consist of an opaque disc having wedge-shaped transparent areas 17, or other conventional arrangements referred to below as well as in the article of A. Vander Lugt. However, the filter 16 shown in the drawing is preferred for use with automatic rose diagram apparatus described in detail below. Light which passes through the wedge-shaped areas 17 of the spatial filter 16 is directed by an imaging lens 18 towards a camera 19 which is focused on a plane containing the image formed by the imaging lens 18. All the foregoing elements are conventional.

The image photographed by the camera 19 is similar to that of the transparency 14 except that spatial frequencies of certain directions are absent, depending upon the angular position of the wedge-shaped areas 17 of the spatial filter 16 at the time the photograph is made. By rotating the spatial filter 16 to various angles, spatial frequencies of certain undesired directions can be filtered out or those in desired directions can be accentuated, depending upon the nature of the spatial filter that is used. It is also possible to combine the use of the rotating wedge spatial filter with an annular ring or disc so as to limit the range of space frequencies considered, regardless of angular direction.

Interposed between the camera 19 and the imaging lens 18 is a beam splitter 20 which permits a portion of the light incident upon it to pass through to the camera 19, and the remainder is directed at right angles to the optic axis 13 towards a photodetector 22. An electrically controllable optical attenuator 21, such as a motorized iris incorporated in the camera 19 is used for controlling the amount of light permitted to enter the camera 19, for a purpose described below. The output of the photodetector 22 consists of a current signal which is fed to a function generator 23. The function generator 23 converts the signal appearing at the output of the detector 22 into any predetermined function; for example, the function generator 23 can be designed to produce a linear output (either positive or negative) or a logarithmic output or any other desired function. The output of the function generator 23 is fed to the optical attenuator 21 to thereby vary the amount of light permitted to enter the camera 19 in accordance with the level of the signal appearing at the output of the function generator 23. The spatial filter 16 may be rotated continuously or in stepwise fashion by means of a motor 24, and as has been explained above, the angular position of the spatial filter 16 determines the spatial frequency content of the light which passes through it.

It will be noted that the apparatus described above can be used to automatically enhance the contrast of nonrandom features in the transparency 14 particularly if the function generator 23 is designed to produce a logarithmic or other nonlinear output, because in such case the optical attenuator 21 will reduce the light passing through it to a very low level except when the spatial filter 16 is in a position corresponding to the position of prominent unidirectional features contained in the transparency 14, such as geological lineaments trending in one direction. When the open or wedge-shaped areas 17 of the spatial filter 16 are aligned with the appropriate spatial frequency components of such features, the output of the photodetector 22 is at a comparatively high level, and thus the optical attenuator 21 permits a comparatively great amount of light to pass through it. Alternatively, the function generator can be operated in the opposite mode, wherein the output of the optical attenuator 21 is a minimum when maximum light falls upon the photodetector 22. In such case, prominent features trending in one direction will tend to be filtered out.

In addition to providing automatic contrast enhancement of transparencies as described above, the present invention is also capable of automatically producing polar plots or rose diagrams of data contained in the transparencies. This is accomplished by means of the following elements. Light from a conventional lamp 25 is collimated by a lens 26 which directs the light towards a rotatable slit 27. Light which passes through the slit 27 next passes through a motorized iris 28 which is positioned in close proximity with and parallel to the slit 27. The iris 28 can be opened and closed by means of a small electric motor 29 which is energized by a conventional feedback control amplifier 30. The input of the control amplifier 30 is connected to the output of the function generator 23 so that the diameter of the opening of the iris 28 is controlled by and responsive to the level of the output of the function generator 23. The purpose of this arrangement is to automatically effectively vary the length of the slit 27 (note that the iris 28 and the slit 27 are in close proximity). It will be understood, of course, that other conventional arrangements can be used for varying the length of the slit 27 in response to a varying electrical signal. Light which passes through the iris 28 is directed towards a camera 32 which is focused upon the slit 27. The camera 32, like camera 19, may be provided with an optical attenuator 31 such as a motorized iris, and the attenuator 31 is connected to the output of the function generator 23 so that it operates in the same manner as the optical attenuator 21. The use of the optical attenuator 31 is optional, its function being to vary the density of lines photographed by the camera 32 to provide a further indication of the density of lineaments in the transparency 14 trending in a given direction. The slit 27 is mechanically coupled to the motor 24 and thus is rotated in synchronism with the spatial filter 16.

In describing the operation of the apparatus in producing a rose diagram, it will be assumed that the transparency 14 contains a number of lineaments trending in a vertical direction, as viewed in the drawing, and that all other features on the transparency 14 are random in nature. Accordingly, the lineaments will be transformed into an array of light spots in the plane of the spatial filter 16, and the majority of these light spots will be at right angles to the direction of the lineaments in the transparency 14, due to the transformation process. When the wedge-shaped transparent areas 17 of the spatial filter 16 are horizontal, the light spots corresponding to the lineaments will be transmitted through the filter 16 and imaged in the camera 19. In addition, the light shining upon the photodetector 22 will be of maximum intensity, because in all other positions of the spatial filter 16 the intensity of the light shining through the spatial filter 16 will be very low. Assuming that the function generator 23 has a positive linear output, the diameter of the iris 28 and the transmission of the optical attenuator 31 will be proportional to the amplitude of the signal appearing at the output of the photodetector 22, and hence proportional to the intensity of the light passing through the spatial filter 16. When the wedge-shaped areas 17 of the spatial filter 16 are horizontal, and maximum light shines through the spatial filter 16, the slit 27 is also in a horizontal position. In addition, the effective length of the slit 27 is a maximum, because the iris 28 is then opened to a maximum degree, so that the length of the slit observed by the camera 32 is a maximum. Also, the amount of light entering the camera 32 also is a maximum because the transmission of the optical attenuator is a maximum. Thus the camera 32 will record a single bright line of maximum length in a horizontal direction, corresponding to the family of vertical lineaments contained in the transparency 14. The camera 32 will not record any other lines if, as stated above, the remaining features in the transparency 14 are completely random in nature. In the more general case, each transparency 14 may contain several families of lineaments, each family trending in a particular direction, with some families containing more lineaments than others, as well as one or more individual lineaments. In such a case, the effective length of the slit 27 as seen by the camera 32 will vary in proportion to the density of the lineaments trending in the same direction; if there are only a few lineaments in a given direction, the effective length of the slit 27 will be comparatively short. Similarly, the intensity of the light passing through the optical attenuator 31 will correspondingly be reduced. Accordingly, after one complete revolution of the slit 27, the camera 32 will have recorded a polar plot of the nonrandom data contained in the transparency 14. The length and density of each "line" recorded by the camera (e.g., the image of the slit 27) is a measure of the density of the lineaments in the transparency 14 trending in a particular direction, and the angular position of each such line corresponds to the relative angular position of each lineament or family of lineaments in the transparency 14.

It will be understood that separate function generators 23 could be employed for controlling the optical attenuator 21, the iris 28 and the optical attenuator 31 if it is desired to have different functions operating the respective elements.

What I claim as my invention is:

1. An optical data processing system of the coherent spatial filter type comprising:
    a. means for directing a beam of collimated coherent light through a transparency containing two-dimensional data to be processed,
    b. first focusing means for focusing said beam in a first focal plane after said beam has passed through said transparency,
    c. rotatable spatial filter means positioned in said first focal plane, said filter having an open area of predetermined shape to permit selected components of said beam to pass therethrough,
    d. second focusing means for focusing in a second focal plane the components of said beam which have passed through said spatial filter means,
    e. a detector positioned to receive a portion of said beam and being adapted to produce an output signal proportional in amplitude to the intensity of said beam,
    f. a function generator connected to said detector for producing a control signal having a predetermined functional relationship to said output signal of said detector,
    g. controllable optical attenuator means positioned to receive said beam after it has passed through said second focusing means, said attenuator means being connected to and controlled by said function generator, whereby the amount of light permitted to pass through said attenuator means is proportional to the level of said control signal, and
    h. means for recording said beam after it has passed through said attenuator, 2. An optical data processing system as claimed in claim 1 wherein said spatial filter means is an opaque disc having wedge-shaped transparent areas.

3. An optical data processing system as claimed in claim 1 wherein said control signal produced by said function generator has a logarithmic relationship to said detector output signal.

4. An optical data processing system as claimed in claim 2 wherein said recording means is a camera focused on the second focal plane.

5. An optical data processing system of the coherent spatial filter type comprising:
   a. means for directing a beam of collimated coherent light through a transparency containing two-dimensional data to be processed,
   b. first focusing means for focusing said beam in a first focal plane after said beam has passed through said transparency,
   c. rotatable spatial filter means positioned in said first focal plane, said filter having an open area of predetermined shape to permit selected components of said beam to pass therethrough,
   d. second focusing means for focusing in a second focal plane the components of said beam which have passed through said spatial filter means,
   e. a detector positioned to receive a portion of said beam and being adapted to produce an output signal proportional in amplitude to the intensity of said beam,
   f. a function generator connected to said detector for producing a control signal having a predetermined functional relationship to said output signal of said detector,
   g. means for forming a second beam of light,
   h. a slit positioned in the path of said second beam,
   i. controllable means for adjusting the effective length of said slit, said adjusting means being connected to the output of said function generator whereby the effective length of said slit is proportioned to the amplitude of said control signal,
   j. means for recording images of said slit, and
   k. means coupled to said spatial filter for varying the relative positions of said recorded images in synchronism with the relative angular positions of said spatial filter.

6. An optical data processing system as claimed in claim 5 wherein said image position varying means comprises means for rotating said slit.

7. An optical data processing system as claimed in claim 6 wherein said adjusting means is a motorized iris positioned in close proximity with said slit.

8. An optical data processing system as claimed in claim 6 wherein said spatial filter means is an opaque disc having wedge-shaped transparent areas.

9. An optical data processing system as claimed in claim 8 wherein said recording means is a camera.

* * * * *